UNITED STATES PATENT OFFICE.

GEORGE T. LEWIS AND CARL V. PETRAEUS, OF PHILADELPHIA, PA.

MANUFACTURE OF ALUMINOUS CAKE.

SPECIFICATION forming part of Letters Patent No. 240,597, dated April 26, 1881.

Application filed December 2, 1880. (No specimens.)

*To all whom it may concern:*

Be it known that we, GEO. T. LEWIS and CARL V. PETRAEUS, of the city and county of Philadelphia, and State of Pennsylvania, have invented a new Improvement in the Manufacture of Aluminous Cake, of which the following is a specification.

Heretofore a process has been described for precipitating iron from a crude solution of aluminous sulphate by adding to the sulphate prussiate of potassa, thereby giving an insoluble prussiate of iron, (Prussian blue,) which may be separated from the alum solution by ordinary means. By this process it has invariably been found that the last trace of prussiate of iron is soluble in the alum solution, and when the solution is evaporated down a blue product is produced which is not free from iron, and therefore is unsalable.
We have found that if, after having made the aluminous solution, we add, either before or after filtration of the liquid from the insoluble silica, &c., the yellow prussiate of potassa, preferably in slight excess—say four to four and a half parts of yellow prussiate of potassa for each part of peroxide of iron in solution—and then add a small quantity of oxide of zinc, metallic zinc, or zinc ore, such as silicate of zinc, carbonate of zinc, or even sulphuret of zinc or blende, the last trace of prussiate of iron is precipitated and the liquid becomes perfectly colorless and free of iron, and the clear solution yields, by proper evaporation, an alum-cake entirely free from iron, and is useful where aluminous cake which contains only a little more than a trace of iron cannot be used. Only a very small quantity of zinc is necessary, still there must be at least enough to precipitate all the excess of prussiate of potassa used, or a little more than one-third part of the excess of prussiate of potassa used. Thus, if for each part of ferric oxide used we have added four to four and a half parts yellow prussiate of potassa we have used a little more than one-half part in excess, and must then add one-sixth part oxide of zinc. If the zinc material used contains iron, care must be taken in also rendering this insoluble by prussiate of potassa.

We are aware that metallic zinc has been used to reduce the iron in aluminous cake when the same has been made from bauxite, which contains iron in the state of the peroxide, but never has metallic zinc, its oxide, &c., as described, been used to remove the last traces of Prussian blue from an aluminous-cake solution.

Therefore our invention consists, essentially, in reducing the peroxide of iron to a state of Prussian blue and removing the last traces of this compound from the aluminous-cake solution, or, in other words, the combination of the two steps to produce an aluminous cake perfectly pure from iron.

Having now described our invention, what we claim as new, and desire to secure by Letters Patent, is—

The herein-described process of purifying a ferruginous aluminous solution, which consists in precipitating the iron of the Prussian blue remaining in the last portions of the aluminous liquor to which yellow prussiate of potassa had been previously added, by treating said liquor by adding thereto metallic zinc, oxide of zinc, or zinc ore, substantially as described.

In testimony of which invention we hereunto set our hands.

GEORGE T. LEWIS. [L. S.]
CARL V. PETRAEUS. [L. S.]

Witnesses:
WM. W. PILKINGTON,
H. R. SHULTZ.